Figure 17:
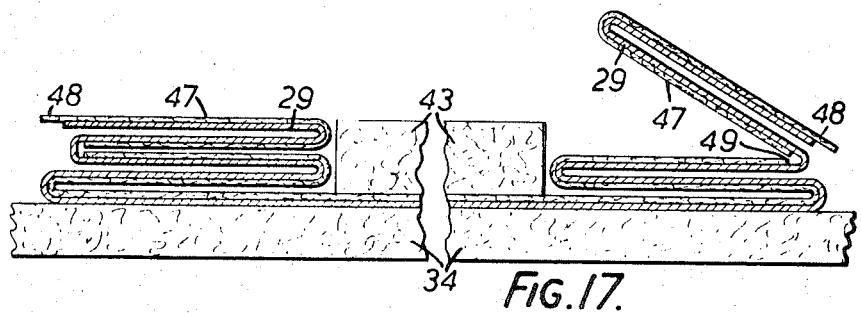

United States Patent [19]

Eisler

[11] 3,721,800

[45] March 20, 1973

[54] ELECTRICAL HEATING FILM

[76] Inventor: Paul Eisler, 57 Exeter Rd., London, N.W. 2, England

[22] Filed: Oct. 26, 1970

[21] Appl. No.: 84,101

Related U.S. Application Data

[62] Division of Ser. No. 590,400, Oct. 28, 1966, Pat. No. 3,539,767, which is a division of Ser. No. 165,736, Jan. 12, 1962, Pat. No. 3,283,284.

[30] Foreign Application Priority Data

Jan. 20, 1961 Great Britain...................2,384/61

[52] U.S. Cl...................................219/213, 219/345
[51] Int. Cl..................................................H05b 1/00
[58] Field of Search......219/213, 345, 528, 535, 538, 219/539, 544, 549, 540–543; 338/203, 210, 212, 260, 333; 165/49

[56] References Cited

UNITED STATES PATENTS

| 2,640,904 | 6/1953 | Gaiser | 219/201 X |
| 2,680,800 | 6/1954 | Chandler | 219/345 |
| 3,266,661 | 8/1966 | Dates | 219/543 X |
| 1,703,005 | 2/1929 | Hewitt | 219/539 X |
| 2,889,439 | 6/1959 | Musgrave | 219/345 |
| 2,777,930 | 1/1957 | Nathanson | 338/203 X |
| 2,680,800 | 6/1954 | Chandler | 219/345 |

*Primary Examiner*—C. L. Albritton
*Attorney*—Laurence R. Brown

[57] ABSTRACT

Space heating means and method having an electric resistance heating film comprising a meander pattern of conductive foil with terminals at least in part integral and of lower resistance than the pattern. The film may be disposed between two layers of which one is a floor or wall covering and the film being bonded to one of the layers and having at least one of the layers composed of a material supplied in roll form and laid in parallel adjacent lengths over a floor or wall surface and metallic strips connecting the heating film to a low voltage supply source.

24 Claims, 30 Drawing Figures

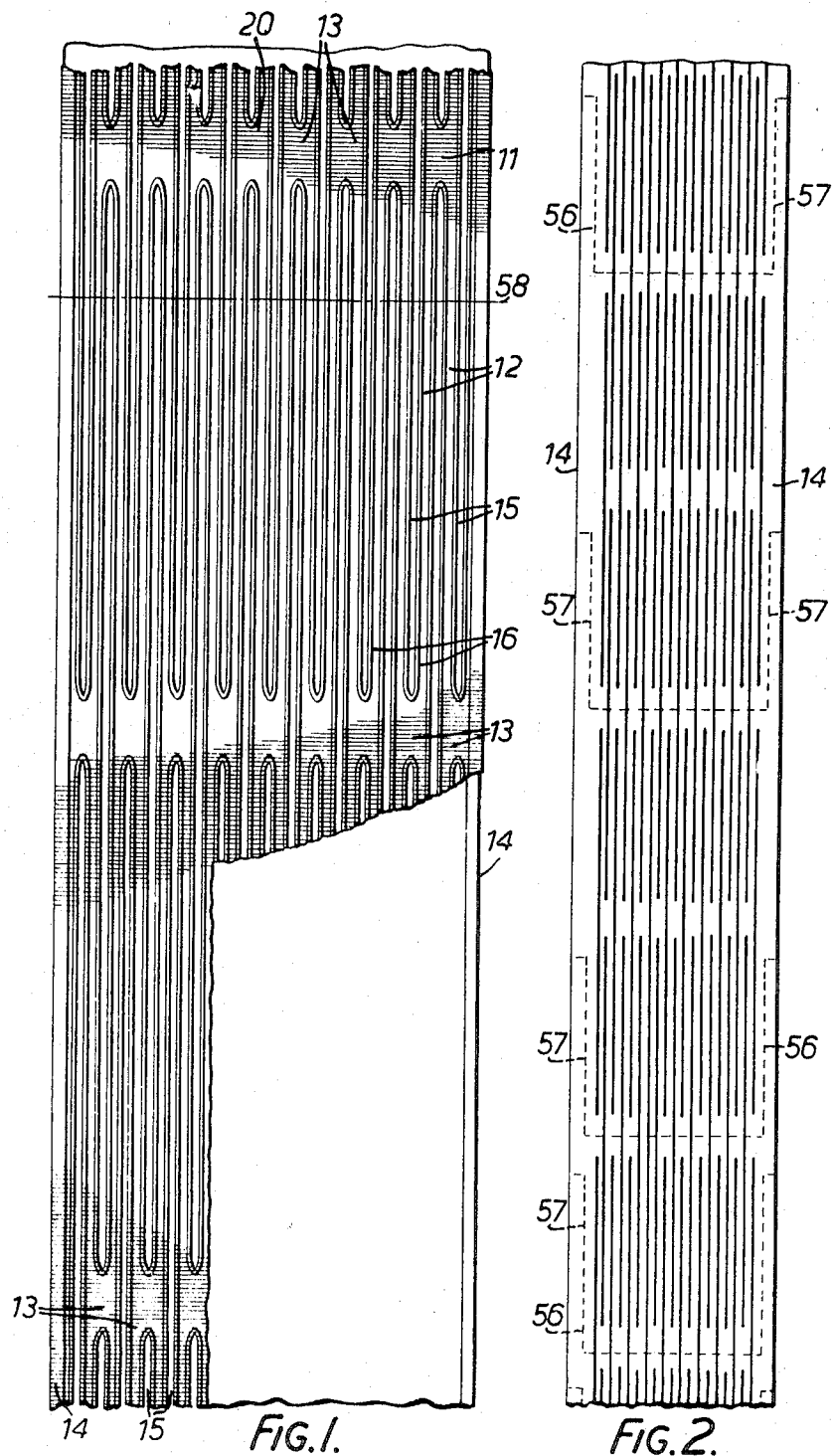

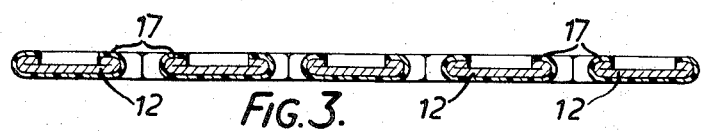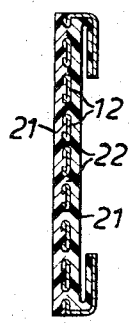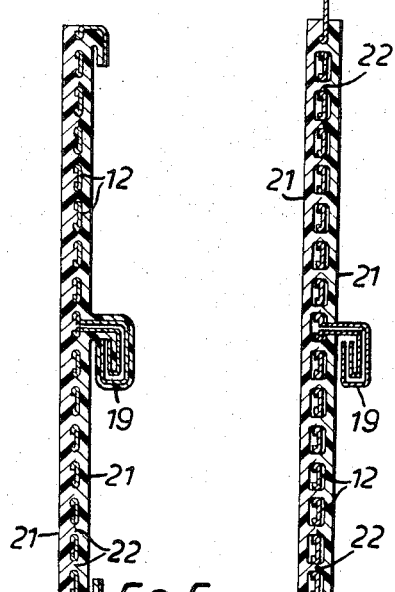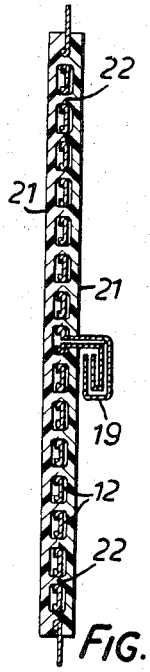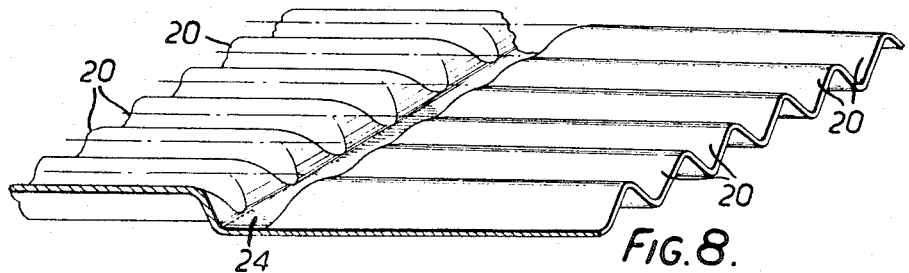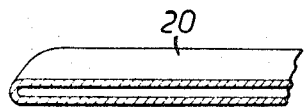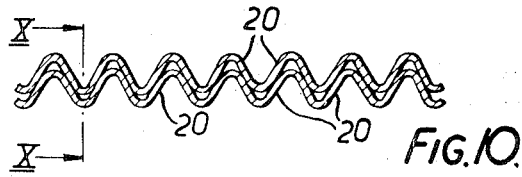

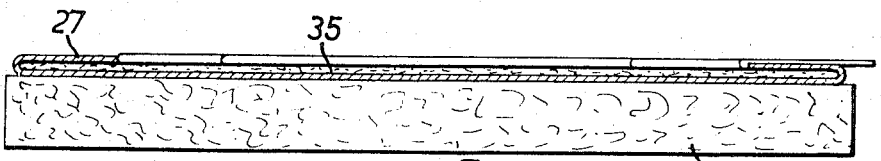
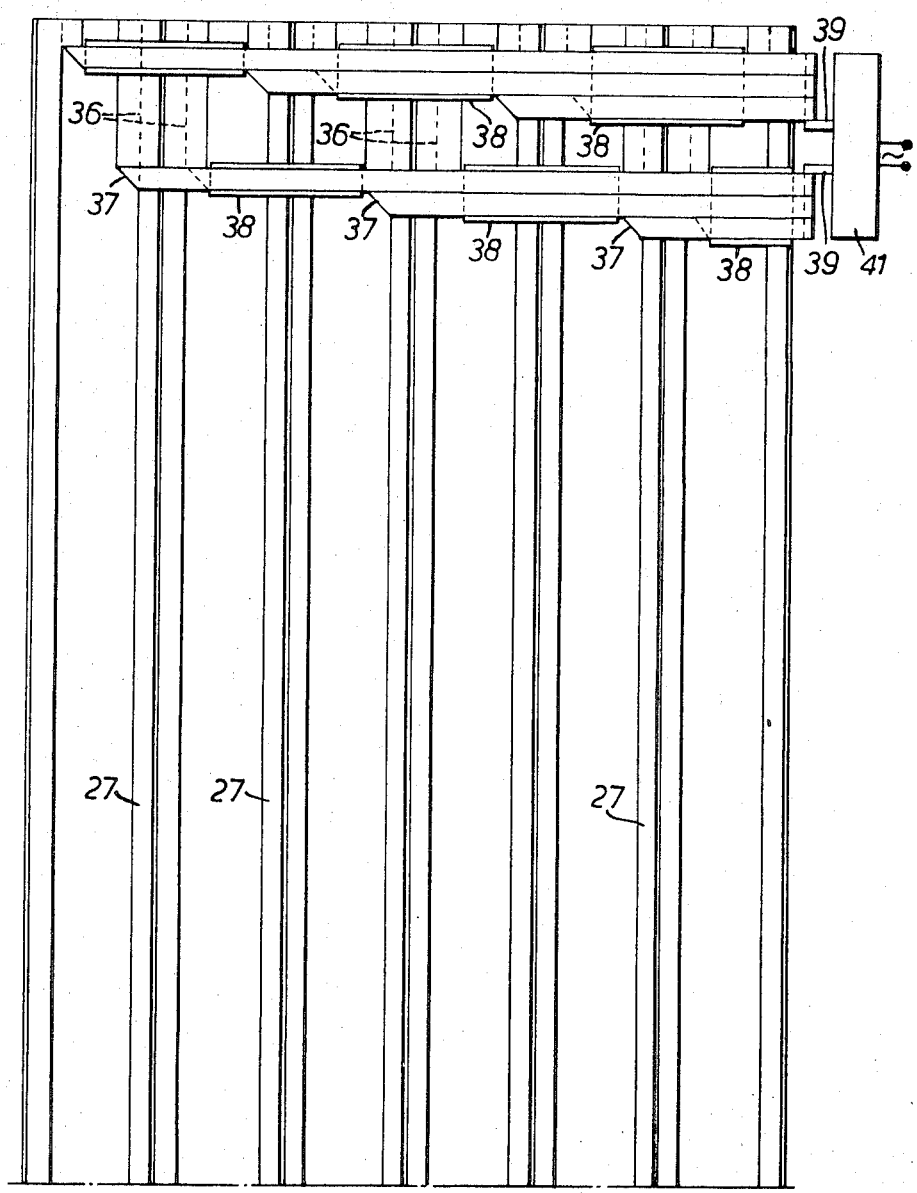

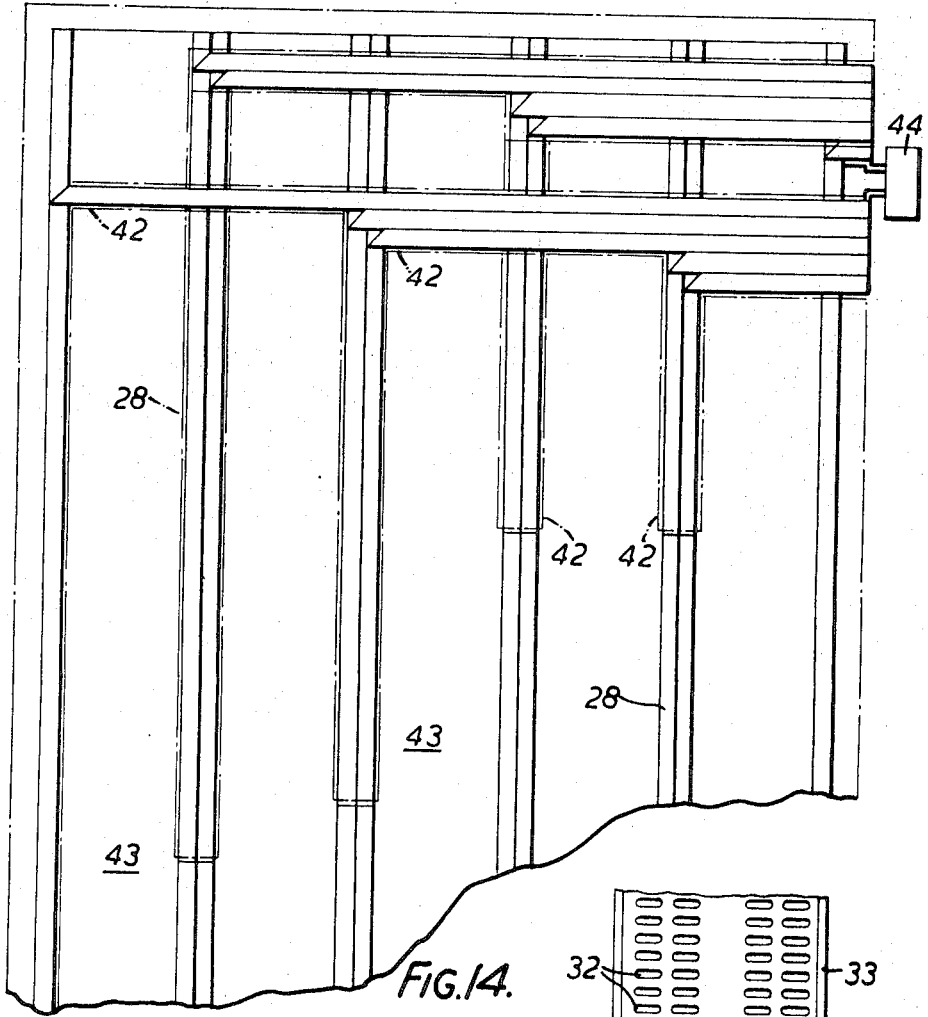

ELECTRICAL HEATING FILM

This application is a division of applicant's co-pending application, Ser. No. 590,400, now U.S. Pat. No. 3,539,767, filed Oct. 28, 1966 as a division of applicant's then co-pending application, Ser. No. 165,736, filed Jan. 12, 1962, issued Nov. 1, 1966, as U.S. Pat. No. 3,283,284.

The present invention relates to electric heating by means of a heating film, that is to say, a structure incorporating at least one conductive meander pattern consisting of substantially parallel conductive arms with narrow elongated insulating spaces between the arms and bridges joining the ends of the arms, which is so thin that the thickness is minute compared with the surface dimensions while the pattern is distributed over and occupies the greater part of the area within the boundaries of the pattern. A film of this kind, preferably dimensioned to operate at low voltage, that is to say, voltage which is not dangerous if human contact is made with the pattern, which in practice usually means a voltage below 50 volts, can be made thin, flexible, and inexpensive and of extremely wide application in that it can be placed almost anywhere within or on the boundary of any space or substance as an instantaneous and homogeneous source of heat of any desired temperature below that of the melting point of the material or materials used in the essential structure of the heating film itself. The space required for the heating film is so negligible in view of its thinness and the cost of the heating film per unit area in most constructions is so low, namely of the order of that of normal dispensable packaging material, that there is no substantial spatial or economic reason in almost any field of use of the film for restricting the heat emitting area constituted by the area of the film. This use of a large area of heating film again permits the desired quantity of heat energy to be emitted at the lowest useful temperature.

Hitherto electrical heating elements have usually been thought of as separate devices, or components of such devices, for the distribution of heat to a space or substance, the devices and the space or substance being regarded as separate entities which are brought together for heating. A heating film while also having a wide field of application as a heating element in such devices can also be regarded as an accessory to substances or to materials forming walls bounding substances or spaces, which can nevertheless be independently produced and be supplied either as a uniform strip cut, or to be cut, to individually required sizes, or can be supplied already in place as an accessory in the substance or wall material. Heatability thereby becomes a characteristic of the substance or wall material.

The present invention has for its principal object novel applications of electric heating films and this includes improved structures of electric heating film.

The invention includes among its specific objects the provision of a prefabricated sheet material which can readily be cut into pieces each piece so cut comprising at least two electric resistance heating films, each dimensioned to serve as a primary heating element, sandwiching a thin thermally insulating layer. The conductive pattern of the two films in a cut piece are preferably identical. One of the two films may suitably be adapted for securing to a wall surface of a space to be heated in good thermal contact with the wall, and the other to radiate heat into the space, so that when the former film is energized the wall stores heat while when the latter film is energized heat is directly radiated into the space, each film serving as a heat reflector for the other. An independent supply and switching means may be included for each film.

The invention also includes among its objects the provision of an improved heating film comprising an electrically conductive foil having narrow elongated openings therein by which at least one meander pattern is defined comprising substantially parallel arms and bridges joining the arms, the foil pattern being characterized by the margins of the foil bounding the long sides of the openings being folded over and back on to the foil arms.

The openings are preferably made as mere slits with adjacent slits overlapping in the longitudinal direction of the arms in which case there is no waste of material and if the folded margins were unfolded they would fill the openings in the foil.

An important requirement in the use of such films is the necessity to make connection to the meander pattern by which the current can be supplied and for this purpose terminals must be provided, which usually need to be of less resistance than the meander path. One form of terminal for the purpose is set forth in my above mentioned application, Ser. No. 590,400. The present invention provides two further novel forms of terminal. In the first form wider areas are provided as integral parts of the pattern itself. In the second form terminals are provided on the structure or material with which the heating film is used, the film being mounted in such a way that conductive connection is made between appropriate areas of the pattern and the terminals. Where the terminals are wider areas of the pattern itself or are permanently attached to it, they may extend along the margins or elsewhere, and by virtue of their lower resistance serve as busbars along which there is negligible voltage drop for any number of meander paths in parallel, and they may be folded over on to the pattern.

Desirably at least the arms of the meander pattern are crimped with the crimp lines running across, preferably at right angles across the arms. This gives the arms (and busbars) longitudinal extensibility which greatly increases the ability of the film to withstand temperature and handling stresses as will be explained in greater detail below, as well as developments wherein narrow uncrimped linear zones are left where the foil is to be folded or severed.

Though in some cases the film may consist of no more than the bare foil pattern suitably held, usually it will be insulated on one or both sides and on the folded margins.

The metal foil preferred in most applications of the heating film is aluminum foil of about or less than 0.002 inch (0.05 mm) thickness.

A convenient standard width of arm is then one-eighth inch (3 mm) but patterns have successfully been made with arms as little as one-sixteenth inch (1.5 mm) wide. There is no difficulty in making them wider if desired, and a machine can readily be constructed on the lines described later which enables the width to be adjusted in multiples of say one-eighth inch. The aluminum foil may be provided on one side over all or selected parts with a conductive coating, e.g. a readily solderable alloy or a conductive adhesive film which makes connection of selected areas to other conductive surfaces easier, and/or on the other side with an insulating varnish, lacquer, or anodic film, thus constituting a very thin double or triple layer material.

The scope of the invention is, however, not restricted to this foil and covers practically any metallic foil, and can be applied also to electrically conductive film material other than metallic foil, for instance carbon or ultra-fine metal-powder-coated insulating film the coating of which has a desired resistance value and characteristic. The expression "foil" is generally used for metal strip up to 0.006 inch (0.15 mm) thickness, but for some metals a somewhat thicker strip is still referred to as foil. The present specification uses the term foil in the same sense. Hereinafter only metallic foil will be referred to.

For applications in which the heating film reaches a temperature in excess of that easily tolerated by a convenient insulating covering, or where irrespective of temperature reached by the film the delicate metallic foil pattern is not exposed to damage by outside forces and can be adequately supported, the preferably crimped metallic foil pattern is not sandwiched between insulating layers, but used without such layers. The maintenance of the spacing of the arms is however not relied on alone for preventing shortcuts, and the metal foil is either lacquered or varnished at least on the surface forming the outside of the folded-over edges, or anodized if it is of aluminum. Fields of application of the heating films according to the invention will be described below and further objects and features of the invention which includes methods of production of the film will appear from the following description with reference to the accompanying drawings.

Figure 18:
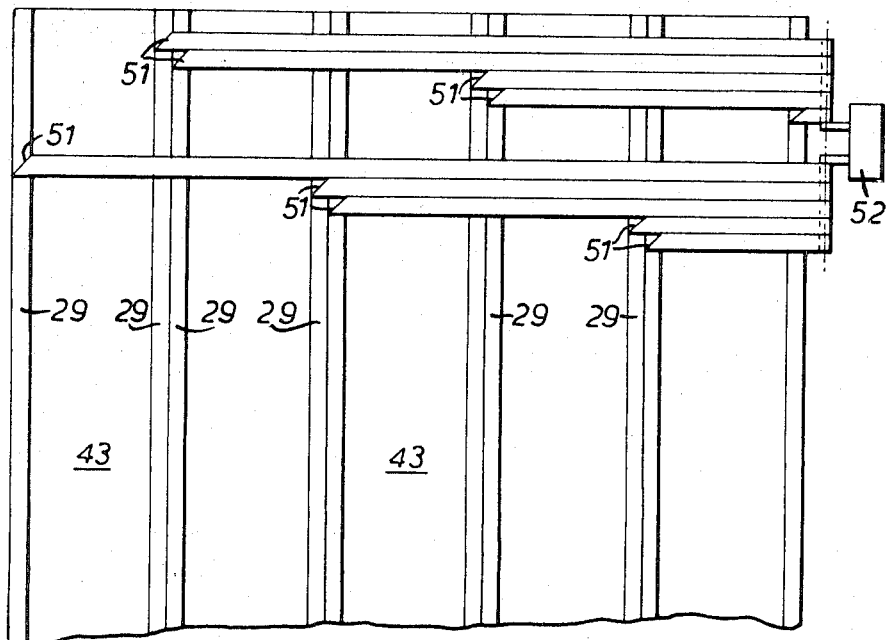
Figure 19:
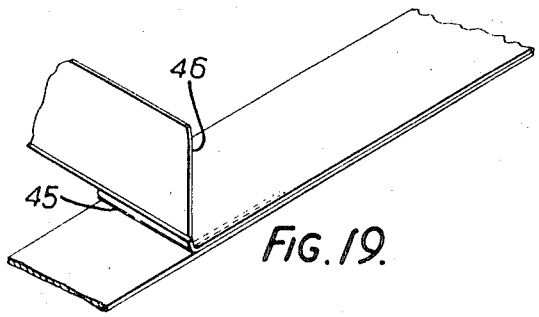
Figure 20:
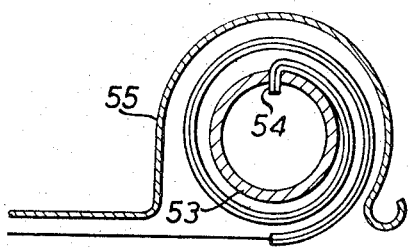
Figure 21:
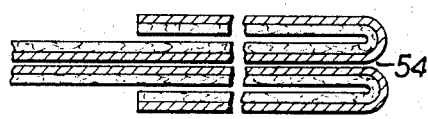
Figure 22:
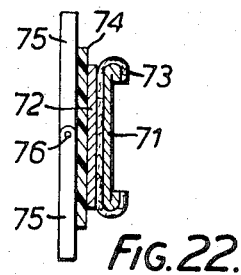
Figure 23:
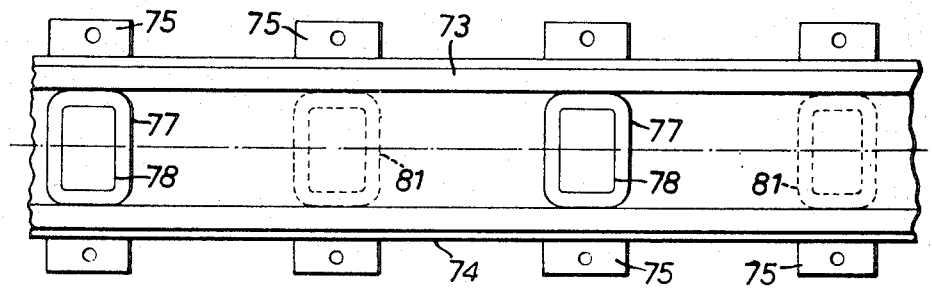
Figure 24:
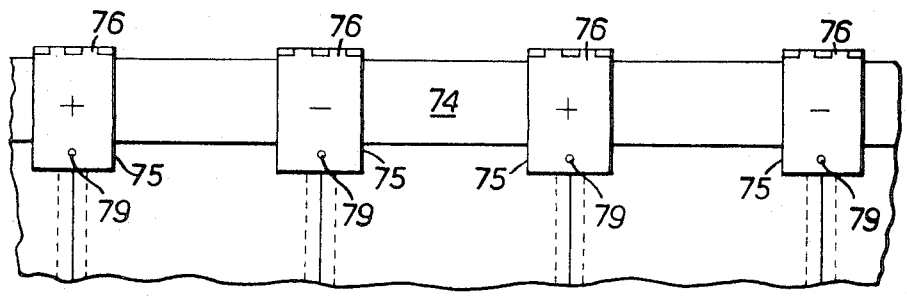
Figure 25:
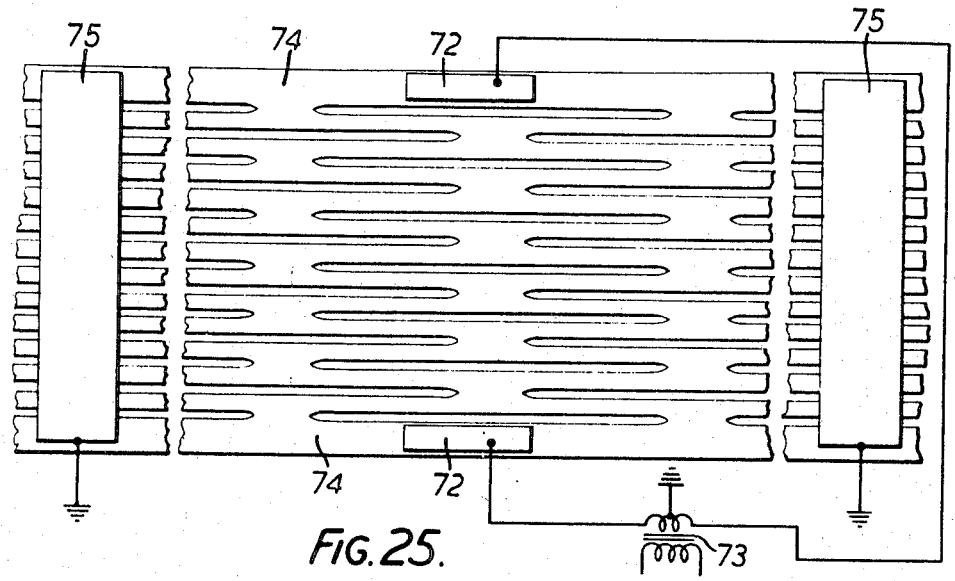
Figure 26:
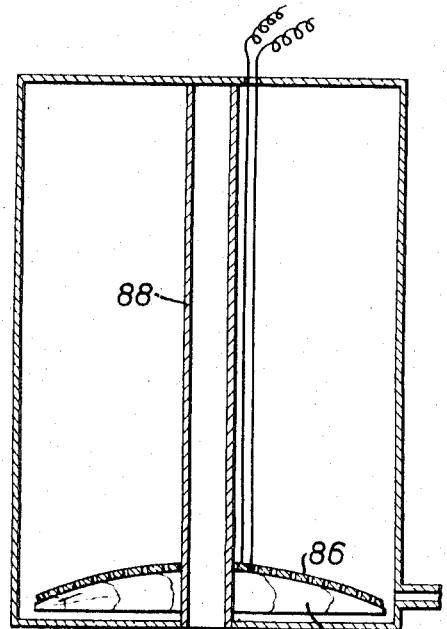
Figure 27:
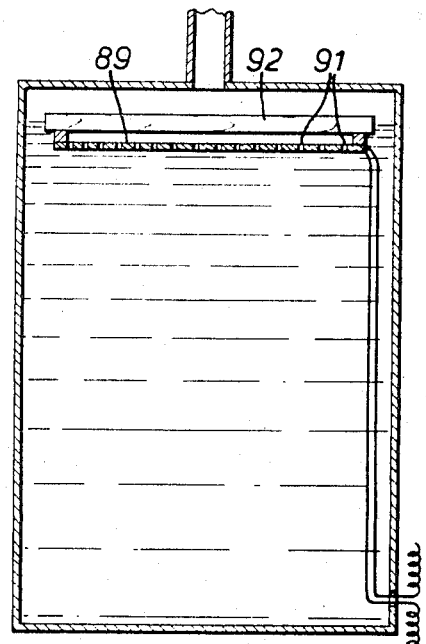
Figures 28, 30:
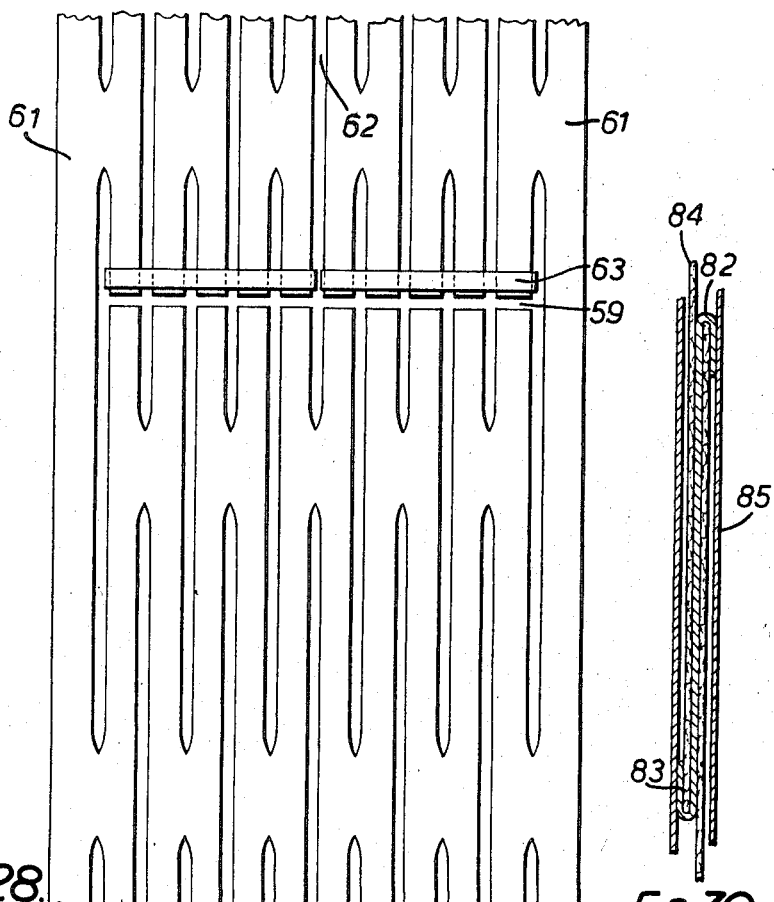
Figure 29:
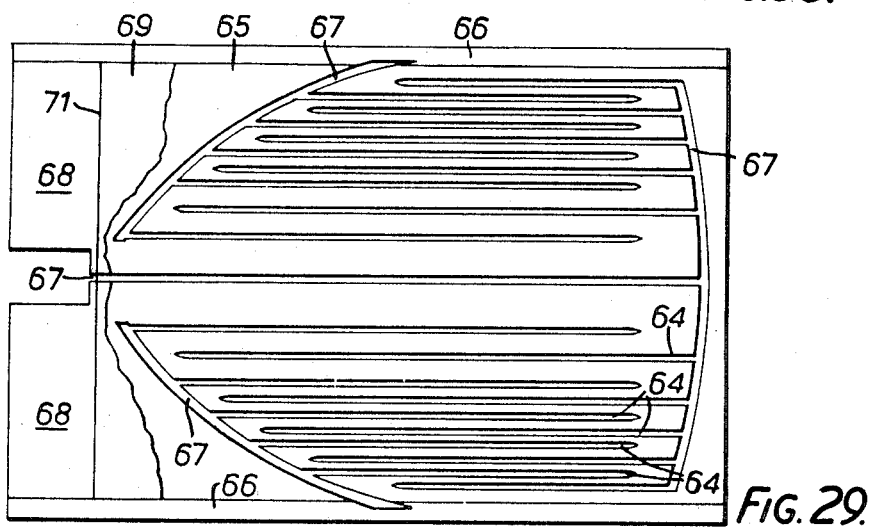

The drawings are highly diagrammatic and the proportions are exaggerated especially as to the thickness, in order to make them clearer. In the drawings;

FIG. 1 is a plan view of a very short portion of a film according to the invention, made in considerable lengths, and from which separate films containing any desired number of repeats can be cut, FIG. 2 is another plan view on a smaller scale than FIG. 1 to illustrate a larger number of repeats and a mode of cutting which without waste provides separate films with extended tongue-like terminals, FIGS. 3 to 7 are cross sections illustrating five alternative forms, FIG. 8 is a perspective view, FIG. 9 an end view and FIG. 10 a section on the line x—x of FIG. 9 showing a preferred method of combining crimping and folding of the conductive foil pattern, FIG. 11 is a cross section of one film and FIG. 12 an underneath plan on a smaller scale of an assembly of such films constituting a floor heating underlay, FIGS. 13 and 14 are similar views to FIGS. 11 and 12 of another embodiment, FIG. 15 is a front view and FIG. 16 a cross section of part of a strip used for increasing the busbar section of a film such as that shown in FIG. 13, FIGS. 17 and 18 are similar views to FIGS. 11 and 12 of yet another embodiment, FIG. 19 illustrates a method of folding of the integral lead of FIGS. 17 and 18, FIG. 20 is a cross section of one form of connection between the film and a supply terminal, FIG. 21 illustrates the preparation of the film for connection to the terminal, FIG. 22 is a section, and FIGS. 23 and 24 are front views of an arrangement for supplying heating films on a wall or similar surface, FIG. 25 illustrates one scheme for heating a film while in movement, FIG. 26 illustrates the use of the heating film for progressively melting a material in a container, FIG. 27 illustrates the use of a heating film for progressively vaporizing a material in a container, FIG. 28 illustrates another form of terminal or lead not integral with the film, FIG. 29 is a plan of an arbitrarily shaped film according to the invention, and FIG. 30 is a cross section of a form of heating panel embodying the heating film.

The electrical heating film shown by way of example by FIGS. 1 to 3 which illustrates part of a film made in lengths only limited by the length in which the material can be obtained, comprises a metallic foil 11 which is slit longitudinally into parallel narrow arms 12 forming in conjunction with bridges 13 joining the ends of the arms, a succession of meander paths between the first and last arms constituted by the margins 14 which are of greater width than the arms 12. The slits between the arms are widened into openings or slots 15 by the margins of the arms being folded over and flattened back on to the arms as at 16. Preferably, the one surface of the foil which is on the outside of the folded margins is lacquered, anodized, or otherwise covered with an insulating layer as at 17 FIG. 3 so that the neighboring folded margins of adjacent arms are not only spaced from each other by the width of both folded-over edges, but also have two layers of insulation between them which prevents a shortcut of the electrical path intended to extend through the full length of the meander arms, if neighboring arms should for instance accidentally contact each other at their folded-over margins. A pinhole or other failure of the insulating layer covering any folded-over margin is unlikely to occur just opposite to a corresponding failure in the insulating layer on the opposite folded-over margin of the neighboring arm.

An insulating film 21 of plastic or elastomeric material, of paper or textile, including glass or quartz fiber cloth, is often used to cover one or both sides of the patterned metallic foil, and these insulating coverings preferably extend into the slots between the meander arms in and beyond the plane of the metallic foil, so that as indicated at 22 they solidly fill the spaces between adjacent arms. If plastic or elastomeric materials are used as both top — and bottom — coverings of the metallic foil pattern their junctions through the spaces between the arms of the pattern can be effected by welding while when these films are layers of paper or textile, adhesives or sewing stitches can be used for joining top and bottom insulating films in the spaces between the arms and, where desired, along and beyond the outside edges of the foil pattern.

Instead of using insulating layers extending as a top and/or bottom covering over the whole or a large part of the width of the foil, a filament or narrow film strip of plastic or adhesive material which melts under heat or an adhesive covered thread or fibrous fabric of about slot width may be fed into the slots between and joined to the parallel meander arms of the foil pattern during the manufacturing process and form an insulating, film-thick link 18 (FIG. 7) between the arms 12 which is of sufficient strength to hold them in position and thus permit the safe handling of the heating film. Such slot filling by adhesive need not produce films in the slots which are free of pores or openings; the foil also may be either perforated or free from holes or pores, it may be bare, anodized or lacquered on one or both sides except over the actual terminals, and this essentially single-layer-type of heating film may form parts of a larger sized heating film the other parts of which may be a double or triple layer type of heating film in which the metal foil is covered by any of the previously described films, textiles or papers on one or both sides.

A particular type of insulating film covering is constituted by the covering containing or consisting of a material which is dry at room temperature but which at least the first time it is heated to a predetermined temperature is adhesive. Such materials are known as dry film adhesives and are usually either thermoplastic compounds or uncured or semi-cured thermosetting or hardening compounds such as are used in bonding or laminating structures for instance under heat or under heat and pressure. A heating film with such covering or coverings is thereby made into a dispensible dry bonding film which can be used like other dry film adhesives with the advantage that heat can be supplied to it in the glue line by passing an electric current through the metal foil pattern. In this way the bonding or laminating process can be speeded up with great convenience and many economies are achieved.

The winder areas on each margin of the film whether of a single width or of several widths joined together by double folds 19, can serve as terminals for the supply of current to the meander patterns extending between them and they must therefore be left bare at least over selected terminal lengths. For convenience these wider areas are folded back over the top surface of the heating film, that is, over the insulation 21, as in FIGS. 1, 4 and 5 and they then form busbars on the top surface of the heating film to which contact can readily be made by means of a clip or other supply device without requiring accurate location. If the whole length of the wider areas is left bare such connection can be made at any point. In particular cases, when the foil is covered with an insulating layer on both surfaces, the wider areas or busbars can be folded over, one over one layer of insulation and the other over the other layer of insulation.

Other forms of terminals will be described below.

The metal foil is preferably crimped either over its whole area or at least over the meander arms, with the crimp lines running across, and preferably at a right angle across, the arms of the meander pattern as indicated for example at 20, FIG. 1. Where terminal areas or the like are to be folded over as above described the folding of the crimped foil presents a problem which arises particularly where the film is being made in a machine through which the foil runs continuously. Scoring the crimped foil and then folding it over at the score leads to undesired creases, mutual interference of the crimps, work hardening at the fold, and uneven reeling. According to a development of the present invention illustrated in somewhat exaggerated form in FIGS. 8, 9 and 10 a narrow linear zone 24 at the folding line is left uncrimped. This may be done simply by grooving at least one of the crimping rollers at the requisite location. A further important development consists in displacing the crimps in the part to be folded over by half a pitch length of the crimps, in other words the crimps on either side of the narrow uncrimped zone are 180° out of phase. This can be achieved by dividing the crimping roller or rollers and slightly spacing the divided parts, which has the same effect as cutting a narrow groove, but also permits the now separate part to be turned through an angle corresponding to half a crimp pitch at its periphery, and then to be fixed. The crimps made in the foil will now run out on either side of the folding line and will have a phase difference of 180°, as visible in FIG. 8. The folding is now done smoothly, the valleys of the crimps in the portion on one side of the folding line lying on the crests of the crimps on the other side as to be seen in FIGS. 9 and 10. If the crimps are not at right angles to the folding line, to obtain superposition in this way it will also be necessary to arrange the crimps on opposite sides of the folding line to opposite hands. This will necessitate the respective parts of the crimping roller or rollers being separately made. If the wider areas are folded on to the insulation, the thicker the insulating film which is usually not crimped and usually covers at least the center part of the foil, the less effective is the matching of the crimps after folding. The interruption presented by the narrow linear zone along the folding line has been found highly effective in practice without any difficulty arising due to stresses in the uncrimped narrow zone. Subsequent annealing of the zone at the folding line has proved unnecessary.

The narrow uncrimped linear zone will also facilitate cutting of the foil along a predetermined line. This may be required as described below to enable part of a wider margin to be folded and carried out to serve as a lead. Where it is only necessary to facilitate cutting or folding over an uncrimped insulating layer the first arrangement above described where at least one of the crimping rollers is simply grooved suffices.

Narrow uncrimped zones may also be used for other purposes and need not be straight. They may be along curves so as to follow the contour of another body or to be readily distorted into a surface which cannot, or cannot conveniently, be developed from a plane. An example is the wrapping of a chicken in a heating film.

When the foil pattern is sandwiched between insulating films the foil need not adhere to the insulation over its whole surface and it is often preferred to leave at least the arms unbonded to the insulation especially in the case in which the foil is crimped. The insulation bonded together through the spaces between the arms forms a flat tubular section as shown in FIG. 6 in which the arms of crimped foil are free to contract and expand. The crimped metal foil may be elastically prestressed so that if its cross section becomes weakened by an accidental hair line crack or by a burn or hole, the parts of the foil on opposite sides of the weakness will retract a little, quickly break the circuit and render arcing more difficult. The contraction of the foil is little hindered when the insulation is not bonded to it but even when it is bonded, the nature of the bond and/or the elasticity of the insulation may be chosen so that in conjunction with the elastic prostressing of the foil the desired contraction is provided for.

Where folded over busbars are provided as above described, the width of the folded back portion if only of single layer form 27, FIG. 11 can extend almost up to the center line of the film, leaving only a small gap. These wider portions may however be folded into multi-layers in which case they can if desired be even wider. The folded over portions may be folded again only once into a flat "U" as 28 FIG. 13, or into a multi-layer zig zag formation as 29 FIG. 17. If the insulating coverings leave those areas of the foil which lie on the inside of these folds bare, additional bare foil strips as 31 FIG. 13 can be readily inserted into the folds and make good contact over their entire length or a sufficient part of their length. Such strips may serve as terminal connections, or simply to reduce the resistance of the busbars. When serving as terminal connections they may extend laterally or longitudinally away from the film and they may be covered wholly or in parts by conductive adhesive or a coat of solder. In order to ensure good contact over at least a large part of the area of these inserted strips when external pressure is not practicable or not reliable, they may be crimped to the underlying foil pattern. Alternatively the strips may be perforated as at 32 FIG. 15 and an adhesive, preferably a conductive adhesive, applied in the perforations. The inserted strip in FIG. 16 is bare on one side only, a paper cover strip 33 on the other side carrying the adhesive which is exposed by and penetrates into the perforations 32. The adhesive constitutes a sort of rivet which holds the inserted strip pressed against the foil pattern.

The wide folded back portion of the busbar can be cut along a part of its length, and the cut length of the strip can be folded at right angles or at any desired angle so as to extend into a direction across the length, i.e. in the direction of the width of the heating film.

FIGS. 12, 14 and 18 show examples of the use of this strip as an integral connecting link and terminal in applications of the heating film as a floor-covering underlay under linoleum or carpeting.

The foil pattern is laminated by means of a polyvinyl chloride adhesive which improves the flame and water-resisting properties of this underlay between a thick underfelt or grey paper 34 and a thin cover paper 35.

Different arrangements of busbars are shown in these figures. In FIG. 12 in which there are single layer folded busbars 27, these are severed along a line defined by a narrow longitudinal uncrimped zone 36 visible in the upper part of figure. The severed portion is folded at 37 and extends laterally across the film. In this example the folded over busbars are assumed to be bare and a simple fold on a line at 45° suffices. All the left hand busbars are grouped together and all the right hand busbars grouped together. The crossing points are insulated by inserted paper-backed aluminum foil sheets indicated at 38. The aluminum foil increases the conductive cross section over each crossing point and thus keeps down the temperature of these transverse leads thus avoiding hot spots in the complete underlay. The outer ends of the leads are cut to length and joined together by connecting links 39 of any convenient type. These links are connected to, or may form, the terminals of a transformer 41 by which mains supply is reduced to a low voltage below 50 volts at which the underlay is operated. This scheme of connection puts all the pairs of busbars in parallel but in any particular case, parts of the complete pattern could be connected in series.

In FIG. 14 the folded over areas are of "U" section and the outermost fold has a cover paper 42. To keep the total thickness more uniform a thick extra cover paper 43 may be provided between the folded busbars. The outermost layers are cut longitudinally at the folds for a suitable length and as before the cut portions are folded over, carried laterally and connected in parallel to a transformer 44. To keep the paper covering outermost on these folded out portions, a double fold may be made as in FIG. 19 where the first fold 45 is made on a transverse line and the second fold on a line 46 at 45°.

In FIGS. 17 and 18 the busbar is folded four times to form a four fold ziz-zag, the paper covering 47 being originally slightly wider than the foil producing an overlapping margin at 48. The paper cover may however, be pre-cut along the fold at 49 and the paper forms a convenient guide for cutting the foil also, the upper two folds being lifted for this purpose as indicated on the right hand side of FIG. 17. After cutting the upper double fold may be lifted and folded at right angles as indicated at 51. The ends are cut to length and connected in parallel to a transformer 52.

The terminals of the transformers 41, 44 or 52 may, at the part to which the connection is made, consist of a split metal tube 53 FIG. 20. Where covered by insulation as in FIGS. 17 and 18, the ends of the folded out leads are doubled back as in FIG. 21 to expose the foil on the outside and the extreme end is introduced into the slot 54 in the tube 53 and the lead wound tightly round the tube to obtain intimate turn-to-turn contact. FIG. 20 is an exploded view for the sake of clarity; in practice the turns are tightly wound and a spring clip 55 or the like then fixes the turns. In the case of FIGS. 12 and 14 the leads again are suitably folded or trimmed to expose the foil before being wound on the terminal.

It will be seen that in the arrangements illustrated in all of FIGS. 11 to 21 the lead out is integral with the film. This is an important facility and makes it possible for the floor underlay or the like easily to be installed by unskilled labor. The leads can easily be connected to external contacts which need not be the terminals of a transformer but can be terminals of switches or points on distributing conductors and may be further away then suggested by the figures. This connection can be effected moreover after the heating film is placed in position and there are no loose pieces. The provision of these integral leads also does not necessitate the film being made or supplied in any particular predetermined length. The whole of the film laid on a floor in parallel portions can be cut from standard long length rolls to suit the particular floor size and since the pattern is uniform and connected in parallel there will be uniform heating and the loading will be proportionate to the area covered.

The arrangements above described with reference to FIGS. 11 to 18 have the heating film, or more specifically the foil pattern secured to a layer which forms an underlay for a floor covering laid over the film, so that the foil is sandwiched between two layers of insulating or at least not highly conductive material. The underlay is a material which is supplied in the roll with the busbars extending longitudinally and the meander paths across, and is cut into pieces laid parallel to one another. If cut at intervals depending on the length of the meander arms, there will be no areas unheated when the heating film is energized. The covering may be in a single piece or several piece or several pieces and may for example be a carpet or of linoleum. In the case of such materials as linoleum, however, which are supplied in the roll, the heating film or foil pattern may be secured to the underside of the material again with the busbars extending longitudinally and the meander paths across, with the same advantages. If an underfelt or felt paper is used as an underlay though this is not always essential, a similar sandwich structure results.

It is not essential that the material carrying the meander pattern (whether for floor-covering or other purposes) should incorporate busbars in the form of wide areas which can be cut to form the leads. Another possibility is as mentioned above to reinforce selected parts of the width of the pattern to serve as busbars. In the case of a pattern consisting of longitudinal arms constituting a sequence of parallel meander patterns, any one line of arms (or preferably several adjacent lines of arms) are reinforced as above mentioned by the addition of metal which reduces the resistance and therefore the voltage drop along them and they thus become busbars. Such addition of metal may be all along the length or separate strips of foil may be conductively connected over short lengths, in particular where the pattern is severed across the bridges and the severed patterns are to be connected in series or parallel.

In principle any known addition of metal, for instance by plating, spraying, or coating with conductive paint, is possible, but the preferred method is to join on a strip of metal foil by any method of conductive joining, such as soldering, or welding, or preferably by means of a conductive adhesive. A conductive adhesive is preferred which contains a high percentage of clean metal powder, preferably a rough, spiky powder of a particle size slightly in excess of the thickness of the adhesive layer, and a medium which shrinks on setting. The metal powders in such adhesive cements dent or penetrate the two foil surfaces and form innumerable metallic links between them. Such conductive adhesive may be used in other applications described hereinafter when a conductive adhesive is needed.

Any width of heating film which has no integral busbars can in this way be provided with busbars along any chosen longitudinal line by conductively joining strips of metal foil over this line for any desired length. It is thus practical to produce heating film in very wide width and to suit individual requirements of any particular use, such as location and described film width, available voltage, and desired loading by conductively sticking longitudinal foil strips over the pattern, and these foil strips can extend beyond the film area and go direct to the switch or terminal of the supply source.

As well as floor coverings (including carpets), leather cloth, paper, plastic film textiles, felting and any material produced in large width may have the foil pattern of the present invention on one side (or some of these materials for some applications on both sides) as a standard production.

The foil strips may be part of the permanent installation and fixed permanently to the structure over which the material is to be placed permanently or temporarily, the joint between the foil strips and the foil pattern being effected on assembly.

As applied to a floor heating installation this method can be used with carpeting, linoleum produced in wide rolls, tiles, boards or other floor coverings made or supplied in sheets of small area with the heating films on the underside of the floor covering material, foil strips functioning as busbars and connecting links being separately laid and only joined on site.

The floor covering materials themselves are supplied with the foil pattern stuck to the underside bare and, where necessary have the top surface marked by a removable label or other sign to indicate the length direction of the pattern so that square tiles for instance can be placed correctly. The minimum length of a tile is the length of a single meander path and any sheet length which is a multiple of the repeat length of the meander pattern can be heated without leaving a cold area across the width of the sheet.

Prior to laying down the floor covering, foil strips for connection to the supply (for example by terminals as in FIG. 20) and interconnection of the tiles, sheets etc, are installed to run in parallel lines along the floor. Their maximum spacing is equal to the width of the tiles, sheets or strips of linoleum or carpeting, but in between this maximum distance as many foil strips may be installed as are called for by the square area resistance of the heating film, the available voltage and desired loading. The latter may be different for different floors and for different areas of the same floor, say higher near the windows than in the center of the floor.

It is possible to provide insulating gaps in the foil pattern by removing the metal in the bridges across the width of the pattern, for instance by abrading, cutting and peeling, or cutting and expanding. Thus any repeat or group of repeats may be connected in series instead of in parallel, as they are normally on the back of the wide rolls of linoleum or other floor-covering material. No such removal of metal is generally required for foil patterns on the back of single sheets or tiles. Unless parts of their foil patterns are overlapped during laying, the foil strips are their only connecting links with the patterns on neighboring sheets or tiles to which they can thereby be connected in series or parallel as desired.

The bonding of the metal foil pattern to the linoleum or other floor covering may be effected by an adhesive which extends over or fills the slots between the arms of the meander pattern and can there be made sticky again during assembly by wetting the pattern with water, solvent or by heat. The floor covering can in this way be stuck to the floor underlay and the foil strips, and this method of sticking alone or in combination with the already previously described methods of joining the foil strip to the foil pattern, or the latter joining methods alone, be used to provide the electrically conductive joints between the foil pattern and foil strips. In addition nailing, clamping with elastic cushioning, or other mechanical means to keep the foil strips in pressure contact with the foil pattern may also be used.

Specific examples of space heating above described have been primarily in the form of floor underlays or coverings. Space heating may also be effected with the heating film applied to the ceiling or to the vertical walls of a room or generally to the internal surfaces of enclosures, either over or more usually behind a decorative covering material. The films may be first secured to the decorative material, or be applied to the surface and then be covered by the decorative material. In particular in the case of material supplied in the roll the foil pattern is preferably disposed with the busbars extending longitudinally and the meander paths across. Then into whatever lengths the material is cut none or practically none is left with any portion not effective for heating. Such material does not afford mechanical protection for the pattern and in particular is not nail proof, but the pattern is adapted to operate at low voltage so that danger does not arise, and it is characteristic of the parallel meander paths (and this applies in most embodiments and applications of the invention) that if any one path is damaged heating effect is only lost in that path without the remainder of the paths being affected.

In these applications, e.g. an aluminum foil pattern on the back of a wallpaper, the adhesive used to secure the foil to the paper is preferably a flame-proofing impregnant for the paper at the same time, and the foil pattern and the adhesive layer afford in a certain measure a two-fold fire protection to the room, i.e. the impervious metallic foil and the impregnated paper.

Where the wall-paper is provided on the back with an aluminum foil pattern which does not incorporate busbars, the busbars and connecting leads may be provided on the outer surface of an underlay of thermally insulating material which is secured to the wall and the wall paper is then secured to the underlay, using conductive adhesive at least over the areas where the pattern is to be connected to the busbars.

Even where the pattern does incorporate integral busbars, integral leads as in FIGS. 12, 14 and 18 may not be so convenient for wall coverings and similar thin material, as separate foil strips coated with pressure sensitive adhesive on the connection areas and covered with paper between these connection areas, run along the wall to supply the films. An alternative supply load is a strip-like cable, i.e. a flat cable with flat conductors preferably of foil.

One convenient arrangement for taking the supply to wall paper (or any other heating film similarly hung in parallel widths) having longitudinal marginal busbars either integral, applied, or on a separate underlay, is illustrated in FIGS. 22 to 24. In this there are two crimped foil strip conductors 71, 72 connected respectively to the two poles of the supply and separated by thin foldable insulation 73 such as paper, folded over the margins of the conductor 71; these three layers may be secured together by adhesive. They are mounted with the interposition of another thin flexible layer 74 of insulation, by means of stiff plates 75 which are hinged at the center as at 76 so that the whole can be folded into a U. The crimped foils 71, 72 may have a narrow uncrimped zone at the fold line and be of opposite phase on opposite sides of the fold line as above described.

At intervals equal to two widths of the wall paper, the conductor 71 is apertured at 77 over the full depth of the distance between the folded over margins of the paper 73 and over a width greater than the width of two busbars of the pattern on the wall paper while the paper itself is also apertured at 78 but the aperture is smaller and located so that the paper overlaps the aperture 77 all round and thus effectively maintains the insulation between the foils 71, 72. Continuity of the conductor 71 is ensured by the margins covered by the folded paper margins, and the foil itself may be folded over or have inserted foil strips or otherwise have its conductivity reinforced at the apertures. The plates 75 are provided at each aperture 77 and also midway between.

The plates 75 are secured along the wall by their lower halves which may be fastened by adhesive, nails or any other convenient means. The underlay is now fixed or the wall paper is now hung so that the two busbars at each two adjoining edges of two widths of paper lap over the supply conductor assembly. If necessary the back surface of the busbars is bared. At each aperture 78 the two adjacent busbars will make contact with foil 72 through the aperture while not making contact with the foil 71 because the aperture 77 is wider than the two busbars. At the intermediate plates 75 the busbars make direct contact with the foil 71 but not with the foil 72, so that the busbars on each width of wall paper make contact respectively with conductors of opposite polarity.

To provide the necessary pressure to make good contact between the busbars and the conductors 71, 72 the upper half of each plate 75 is folded over at the hinge 76 and secured for instance by a nail or fastener 79, the insulation 74 preferably being resilient to ensure good pressure distribution.

It will be noted that nails could also be driven through the plates 75 within the area of the apertures 78 without short-circuiting the conductors and similar provision may be made at the intermediate plates by aperturing the foil 72 (and if desired the paper 73 over a smaller area) as indicated by the dotted lines 81 in FIGS. 23. FIGS. 22 and 23 show the connecting leads before folding while FIG. 24 shows them after folding. The faces of the plates 75 visible in FIG. 24 may be decoratively finished or the whole arrangement may be covered by a decorative material.

Instead of pressing the connections into contact by the plates 75 a conductive adhesive could be used.

The schemes above described with reference to floors and walls can equally be applied to the interior surfaces of motor vehicles, cabins, to table tops, packages and almost any structures which it is desired to heat and to the surfaces of which the heating film can be applied. Industrial applications include foil patterned lagging round pipes and foil patterned belts which carry the pattern past contact rollers. The electric current between these contact rollers flows through that part of the foil pattern which is passing between the rollers, this part thereby being heated.

One possibility in which the flow does not follow the meander path is that described later with reference to FIG. 31 in which three rollers are used during the lamination of the insulating covering. If the meander patterns are in series connection however, the current will pass through them in a zig-zag path across the width of the film.

In other schemes the rollers may be replaced by other types of contact for example smooth rods over which the film slides, or discs each contacting only one arm or group of arms. If these contacts are spaced across the width of the foil, the current flows transversely with a value which falls off in front of and behind the location of their contacts, and the heat developed will be according to the current value and distribution.

A particular arrangement uses four rollers. Two opposite short rollers (or discs) 72 FIG. 25 connected to the low voltage side of a stepdown transformer 73 the center of which is earthed, make contact with the opposite margins 74 of the pattern, so that the margins are at substantially equal and opposite potentials from earth. The other two rollers 75 are connected to earth and make contact over the whole width of the pattern at a relatively long distance in front of and behind the location of the first two rollers, so that the resistance from the first two to the last two rollers is sufficient to avoid a short cut through the margins and these two rollers. They limit the length of pattern which is energized and where conditions allow or require one or both of the second two rollers may be omitted. With these arrangements the current flow is from one margin to the other and the other and falls off with increasing longitudinal distance from the first two rollers, and the pattern itself determines the value of the current at a given supply voltage.

In general where outside pressure can be relied on for contact between the foil pattern and independent strip-like contact members over an adequate area the provision of busbars in the foil pattern is not necessary. At least two such contact strips or equivalents may be provided usually as parallel strips on the insulating or insulated surface of any structure or body and be connected to a low voltage supply; a material, for instance a plastic cloth, having the bare foil pattern on its underside is then placed over the surface so that the meander arms are parallel with the contact strips. Heat will be generated at full load in the area directly between the contact strips and at a gradually decreasing load in front of and in back of this area within the spacing between the contact strips. No heat will be generated on either side of this spacing. If the spread of heat in the direction but beyond the area between the contact strips is to be prevented the foil pattern may be interrupted by gaps between the repeats so that it contains only separate rows of meanders extending over the whole or a desired width of the material. The separate meander paths are then connected in parallel or series by the contact strips against which they are pressed, the position and length of the contact strips determining which parts of the meander patterns are in parallel, series or in a combination of such circuits.

A practical example of this variety of the heating film is a table cloth the underside of which is covered with a foil pattern all over or in selected areas only to correspond with the decorative top surface of the table cloth. The foil pattern also may consist either of coherent or separate rows of meander paths extending over the whole pattern width, the meander arms being all parallel and in the longitudinal direction.

The table top over which the table cloth is spread may be of plastic or wood, or be covered with paper or another insulating layer if it is a metallic table top. Along its two long edges two bare metal strips are fixed and connected through a switch to the secondary, low-voltage terminals of a transformer. Having laid the table cloth over the table top two rubber channels or other clamps are supplied which fix the table cloth along the table edge and press it against the metal strips. The metal strips on the edges of the table top can consist of separate pieces of approximately the same length as the meander arms and have links which enable them to be joined in such an arrangement that the foil pattern paths are interconnected by them in series or parallel circuit as may be desired for various heating effects or various types of table coverings.

While clamps or equivalent devices are usually needed to ensure pressure contact between the foil pattern and the contact strips on flat surfaces, on cylindrical surfaces the required pressure can be obtained by circumferentially tensioning the material carrying the foil pattern. Even if this material stretches considerably the fact that the foil is crimped prevents it being stressed unduly or being torn. If desirable it can be arranged that the material tears before the foil suffers such strain as to tear.

Another particular field of use of the heating film being a foil meander pattern without busbars on the underside of a material to be applied to permanent busbar or contact strips fixed and spaced to individual requirements on structures or bodies and removably held to these strips by pressure or conductive adhesive is that of dispensible heating-film-carrying materials. The table tops above described may be in a canteen and the table cloth may be a dispensible paper table cover with the foil pattern on its underside. Or a sheet of foil pattern clad paper may be wound round a cylindrical container drum made of insulating material or of metal covered with a paper label which has metallic bands round the periphery. Such foil clad paper or other dispensible material can be produced in reels of large width with a standard pattern all over the width and practically any size of piece of the material of any width and of any length not less than the length of the meander arms can be used. Purchase of the material by reference to the length of the repeat pattern and square area resistance denomination, which should be clearly indicated on it, gives the user practically all the information necessary for the placing of the contact strips in order to obtain the desired heating performance on an individual surface of practically any size, basically limited only by the temperature limits of the material or surface. These dispensible heating films constitute a very versatile surface heating element having many applications in house and garden, on tour and at work even where the surfaces to be heated have not been designed for such purpose.

A heating film according to the present invention can be constructed with two super-posed foil patterns each comprising at least one meander path, separated by a layer of insulation. Terminals and so forth can be constructed either integrally or separately in any of the manners above described. It is not necessary that both patterns should be identical. The two patterns may be in use simultaneously when heat will be transmitted from the material in both directions, or they may be used singly in which case the one foil pattern transmits heat in the direction away from the other foil pattern which then acts as a heat reflector thereby intensifying the heat flow in the aforesaid direction from the first foil pattern.

This last mode of operation is very suitable for space heating when the one pattern faces and is in good thermal contact with the surface of the building or other structure, for example a floor, wall or ceiling and is heated at times for example when a lower tariff operates and much of the heat flows into the structure and is thereby stored. This heat will be given out later and when exhausted or insufficient can be supplemented by operating the other pattern. Both circuits may have completely independent supply means, meters, switches and so forth. It is important that the insulating layer should have good thermal insulating qualities for this mode of operation. The outer foil pattern may be covered with a thin decorative material or be otherwise decorated by painting, lacquering or the like or the bare pattern itself may be regarded as sufficiently decorative to satisfy some tastes.

Such double patterns can be used for other purposes for instance in packaging, heating of containers, liquids, building materials and industrial plants. It may be used for radiators intended to omit heat in both directions and as immersion heating elements for liquids, gases, or the contents of packages or it may be used for making a package or container and the material may be held in a frame or between clamps acting as terminals, busbars or interconnecting means. When both patterns are to be simultaneously in use, the thermal insulating qualities of the insulating layer are usually unimportant and it will be selected for its ability to support the pattern and where necessary form a wall separating substances on either side.

A number of examples of the use of the heating film have already been described in detail. In space heating if the heating film covers the major part of surface bounding the space whether in a building, vehicle or boat, almost instantaneous heating can be obtained in view of the negligible inertia of the heating film and the low voltage at which it is operated which makes it safe to arrange it without a thick surface cover on a major portion of the available wall area. As also mentioned above the heating film can be used as a packaging material to form the walls or a part of the walls of a container for a substance to have its physical condition changed by heat, a foodstuff or a chemical which is to be heated while it is in the container or during its movement in and out of the container or package.

The qualities of the heating film referred to above render it a dispensible packaging material, and it can be made so inexpensive, safe, but at the same time unsuitable for repeated use by the choice of the particular insulating covering or slot-filling material, or the way in which it is arranged in the package, that it has to be dispensed with or destroyed after use. The heating film can also be placed as a dispensible or repeatedly usable element at least partly within the walls of a container, or at least partly immersed in its contents, for instance in cotton wool, lint, bandages or the like used for medical or surgical purposes.

Further examples of the use of the film as a dispensible element and constituting part of the present invention, are the uses of the heating film in building and civil engineering for the acceleration of the setting of cast concrete mixtures, road surfacing, drainage and roofing materials, building boards, acoustic wall materials, and so forth. The speed of building work on site and in the prefabrication of structures including walls, boards, and pipes is to a considerable extent determined by the speed with which the above materials, usually applied as a slurry of cement and aggregate, set and harden.

According to the present invention heating films are placed within the cross-section of the structure, preferably in parallel layers of large area and/or on its surface prior to or during the pouring of the concrete mixture; they are laid on top of road foundations or within the thickness of the road surfacing layer itself during road building; and similar arrangements for positioning of the films are made in the building or prefabrication of drainage channels and pipes and other structural or wall-forming building materials.

When placed within the midst of the substance the setting of which is to be accelerated by the heat emitted from the heating film, paper is usually chosen as the covering material for the film. The reason for this is its low cost, the permeability of the paper which is readily impregnated with the slurry, and the possibility of introducing additional hardening or catalytic chemicals to the slurry by pre-impregnating or by coating the paper with such chemicals prior to use. This latter function is additional to the acceleration by heat and often permits the components actually used in the material to be so much stronger in catalysts or hardeners that it would not be practical if the whole of the materials used were mixed in vessels. It may here be mentioned that notwithstanding the impregnation of the paper, the leakage of current at the low voltage contemplated is minute, it only serves to supply further heat and the total load can be kept at a desired value by regulation of the low supply voltage.

Generally the heating films remain in the structure; they are dispensed with. In some instances, however, if their terminals are left accessible those near the surface can with advantage be used again for heating selected areas of the building or structure after completion, for instance for heating a road surface for purposes of de-icing or frost prevention. If used on a larger area, for instance when building runways on aerodromes, they may be re-used for defogging the runway. Still larger areas of a city's road surfaces heated by the heating film may contribute to reducing air pollution by warming the polluted air on the ground and thus effect or accelerate its rising. De-icing of a road way is carried out by successively switching on sections of the heating film embedded in the road surface in front of a motorized rotary brush or pushing device, just long enough to melt the ice layer at the road-ice interface. The ice having thus lost anchorage is pushed away by the brush or blade.

The use of the heating film for accelerating chemical reactions is not restricted to the building industry or civil engineering. The heating film may be used as an insert in laminates made with low-pressure thermosetting resins in which case at least one film constitutes one of the laminae. The film may be used as an insert in cold mouldings or castings of vulcanizable elastomeric compounds including Neoprene, in low-pressure, low-temperature-curing thermosetting resin compounds (epoxy-, polyester-, acid catalyzed phenolic-, and neutral resorcinol resins among others) and it may be placed in or near paint or adhesive film layers effecting a bond by curing. This last named application taken together with the previously described use of the film as dry bonding film in which the covering of the foil pattern itself is the adhesive, renders the heating film of interest to the production of timber structures and boat hulls, plastic, rubber and laminated tubes and pipes, wood and plastic furniture, leather and rubber articles, and so forth. It generates the required heat uniformly near the glueline or in the glue line directly. It may contribute some strengthening or better thermal conduction in the glue line though this is usually only of minor importance. The film is dispensed with when used, though into the laminate itself, and can thus serve to heat the laminate, for example if this laminate is afterwards painted and quick drying or curing is desired or where it is to be de-iced or heated for some other purpose.

It should be noted that the role of the heating film as an accelerating accessory to a chemical substance, article or structure is not restricted to the reaction between hardening compounds, such as resin-and hardener mixtures, vulcanizable elastomers or the building materials referred to above. The heating film can perform a similar role for other chemical reactions, for instance if vapor or gas is to be produced by chemical reaction from liquids or form solid chemicals. Examples are the heating of blowing agents (e.g. sodium bicarbonate, hydrazine derivatives) as a means of producing pressure or expansion or the heating of ammonium chloride and potassium bichromate for the generation of an inert atmosphere of nitrogen.

The heating film may also be used in conjunction with a material which undergoes a change of physical condition by being heated during use, for example melted, or rendered more fluid, or vaporized, or sublined. The material can be supplied with the heating film firmly incorporated. Since the film is cheap it may be incorporated in a dispensible drum of a solid material needing to be melted to remove it from the drum, the film occupying a substantial proportion of the total area in contact with the material. The application of the film for producing changes of physical condition is also useful for example in building and civil engineering. Thus the film may be inserted in the material or be placed over foundations or surfaces over which the material is then spread. Such materials are for instance asphalt or other bituminous compounds, coal-tar, caulking, gap-filling and jointing compounds, which are dispensed either as hot liquids from a vessel or container, bag, drum, spreader or the like (which itself may contain a heating film effecting the heating for dispensing) or in a powder or granular form. The heating film extending over the area of application or located within the space filled by these materials has the function of either making the already liquid materials still hotter, less viscous and better flowing, or, if the materials are powdery or granular, of liquefying them in the first place.

The heating film can have perforations and can be placed within a substance in any configuration most efficient for the desired timing and heat transmission to the substance. The best configuration, best spacing of parallel layers of the film, progress of heating and of flow of the substance, liquid or vapor, can be experimentally studied in cross-sectional models. A container with at least one window enabling a cross-sectional view of the model layout to be taken, for instance having at least one transparent wall parallel to the cross-section of the heating film configuration to be investigated, constitutes a viewing box for visibly observing the heating effect, and such a box is a convenient experimental tool for optimizing many parameters of the arrangement, such as location of heating films within the substance and on its boundaries, loading of the film or particular areas of the film in Watts per unit area, distribution and structure of the substance, container shape and so forth.

Viewing boxes are usuable in the study of many heating film applications. The observation of the temperature rise at critical points in the viewing box can be carried out by the provision of thermocouples or other temperature sensing devices at these points, and where no visible change in the substance occurs during the proposed heating cycle — such as in the mere warming of some foods within their packages, substance or films can be colored with temperature indicating chemicals (dyes or pigments).

The use of the heating films for accelerating chemical reactions, boiling of liquids or melting of solids can almost always be followed visibly without such helps, and movements of the heating film are also readily visible.

The following examples of the heating of a substance by a moving heating film according to the invention may illustrate this application. The first concerns the melting of a solid material, for instance paraffin wax or phenol in a drum which may be a dispensible drum. At the bottom of the drum a heating film 86, FIG. 26, is fixed to the upper surface of a part spherical disc 87 of a diameter slightly smaller than that of the drum. It has a lower specific weight than the wax or phenol so that it rises as melting proceeds. The heating film is thus kept always pressed against the bottom of the solid material, even when the solid mass breaks off the walls and sinks. The disc 87 may be guided over a central guide 88. When all the solid has been melted the film reaches the top of the drum where it can actuate a signal or a cut-off switch. This method of heating is most economical and avoids over-heating, both in time and temperature.

The second example concerns a solid or liquid which has to be vaporized steadily without bringing the whole mass to the boil. A heating film 89, FIG. 27, with ample perforations 91 is located at the top of the liquid or solid mass, sunk or embedded into it just enough to be reliably covered, and arrangements are made, e.g. by a floating frame 98 always to maintain this distance of the film from the surface. When needed the film is fully switched on. It heats the surface layer of the material to boiling point and supplies to it the heat of vaporization which starts in the case of a solid long before all the solid is melted adjacent to the bottom of the part which is liquid. As the liquid vaporizes, the liquid level and the heating film tied to this level descend until the film reaches the bottom where it can actuate contacts of, for instance an automatic switching device. A similar scheme can be used to render a liquid more fluid for discharge for use.

A similar method can be employed for piercing a hole or recess into a frozen or other liquefiable solid by fixing a perforated heating film on the end of a tube, pressing this end of the tube against the solid while current is supplied to the heating film, and removing the molten liquid by suction.

As will be understood from the examples given already, the melting of solids, be it ice or other frozen liquids, or glues, thermoplastics, waxes, phenol, coaltar, or other solids in their containers, on their way to and from the container, or on site, is not the only field of application in which the heating film can effect or accelerate a transition of a substance from one physical state into another.

A particular method and field of application is its use for transforming a liquid into another physical state, gaseous or solid, when the liquid is absorbed or absorbed in a layer which requires to be dried. The heating film in this case is placed in good heat conductive contact with this layer over substantially the whole area of the layer, and is supplied only with electric low-voltage current of such intensity that its temperature is raised but does not during the heating cycle exceed at any point within the film the temperature of immediate transition of the liquid into the other physical state. This method combines gentleness with safety, speed and efficiency and can be used for speeding the drying of wet fabric, for drying layers of hay and various other agricultural products, for instance for the purpose of storage, for drying of hair, or for drying of paint. In drying of some paints the action of the film may simultaneously accelerate the physical process of transition of the liquid into the solid or vapor state, and the chemical reaction of the paint constituents with each other or the air, as the paint film may dry by evaporation, polymerization or oxidation, or a combination of these processes. For quick drying or stoving of paints or enamels on sheet metal, the reverse side of the metal sheet may be clad with heating film, and such clad metal sheet may be sold as such, either as plain sheet or as expanded metal sheet, the expansion pattern registering with the foil pattern or the heating film bonded to the sheet.

A novel use of expanded metal sheets is described in "The Accelerated Freeze-Drying method of Food Preservation" Report by the Ministry of Agriculture, Fisheries and Food. H.M. Stationery Office, London, 1961, p.24 and elsewhere; the present invention renders these expanded metal sheets directly heatable.

In the accelerated freeze drying method of preservation of food and other biological material, two further applications of the heating film can be illustrated which form part of the present invention. The first consists in placing a preferably preforated heating film in the frozen material and preferably in the heart of the material, that is that zone of the food, usually the center plane of a slab dried from both sides, which remains frozen to the last. It is supplied with low voltage electric current of sufficient intensity to supply the heat of sublimation to the material during the drying operation in vacuum and this heat can travel through the thickness of the material over the good heat conducting path of the still frozen material out to the layer at which the ice is sublimed. Hitherto the heat had to be transmitted to the outside surfaces of the material by conduction or radiation and thus proceed to the layer at which sublimation takes place over the bad heat conductive path of the thickness of the dried material. The resistance to the heat flow from the outside grows the further the drying progresses, and thus the speed of drying is slow and the operation costly. The above described use of the heating film overcomes these disadvantages and as the heating film is dispensible and need not be removed from the dried material, this method results in supplies of dried material with a heating film already immersed in it ready for packing e.g. as food which after reconstitution can be heated in the package by the same heating film. If the food is to be packed in single portions, separate heating films or a heating film readily severed into corresponding portions may be used.

The second application which is proposed in the accelerated freeze drying plant, though it can equally be used in other plants, concerns the condenser which cooperates with the vacuum pump in order to achieve the vacuum required. Its role in the evacuation system is the condensation of the vapor as ice on its surface so that the vacuum pump can operate. Its initial efficiency is good, but the longer the evacuation the thicker the ice formation on the condenser surfaces and the lower therefore its efficiency. The present invention proposes to de-ice these surfaces periodically during the evacuation period, and for that purpose to cover them with heating film. It is preferred that the condenser surfaces should be curved so that the heating film can be stretched tightly over them and a layer of grease be used to perfect this contact. For de-icing a heat shock is given to the ice face on the heating film sufficient to melt it, and a mechanical movement, suitably a vibration, is transmitted to the ice which slides off. This arrangement is preferable to sliding the whole film with the adhering ice off the condenser.

The heating film can be employed not only for de-icing but for refrigeration itself. In the case of an absorption refrigerator since the method of invention enables the heat to be applied with little inertia over a very large area the times of the alternate phases of absorption of the vapor and of regeneration of the solid can be substantially shortened, and larger quantities of absorbent solids can be used and used more efficiently. In this particular application the film will be porous or perforated and is disposed within the absorbent materials in a series of parallel layers or preferably made into flat bags which enclose a very thin layer of the absorbent solids. A maximum surface of solids is therefore presented to the vapor coming from the evaporator and exposed to the heat carried at high rate to the solids from the large surface area of the film.

A suitable arrangement comprises at least two chambers A and B filled with absorbent solids and heating film and the necessary piping, valves and switching to effect the following cycle of operation:

First phase, Chamber A acts as evaporator, its solids are wet and its heating film is on. Chamber B is connected with the condenser. Its solids are dry and its film is off.

Vapor flows from A via condenser to B where it is absorbed. At the end of the first phase the solids in Chamber A are dried and those in Chamber B are wet.

In the second phase, Chamber B acts as evaporator and its heating film is switched on. Chamber A is connected with the condenser, its heating film is off and the vapor is absorbed by its solids.

After this second phase the cycle repeats with the first phase and so on. The heating film temperature need not rise much above the temperature required for regeneration and the small mass of the film enables it to cool and heat rapidly so that changes from one phase to another both on the film and in the powder can take place very quickly. This property together with the large surface area of the film enables absorption refrigerators of larger capacity to be built than at present possible.

Finally two particularly simple applications in which the film as such is an article of commerce:

The first uses the film consisting of the foil pattern having a hot melt adhesive layer on one side and a decorative or other non-adhesive film or paper on the other. In this embodiment it is a self-adhesive film, usable for most applications for which a pressure-sensitive self-adhesive film is used, with the difference that it is not sticky and can therefore be readily put in position and shifted about and only adheres when a low-voltage electric current supplies it with a heat shock while it is pressed down. The film dispenser itself may have the necessary terminals or clips for the supply of the current.

The second application is a film perforated or arranged in narrow strips as a heating film in horticulture where it has a wide field of use for soil heating seed and propagation boxes, trays, crop bags and pots for flowers or other plants, and in wider strips can also be used for skirting heating in green-houses. Plastic cover films over the aluminum foil pattern are usually employed, or the structure described below with reference to FIG. 30 is very suitable.

The examples of fields of application given above are not exhaustive, but have been given here in order to demonstrate the almost universal applicability of the heating film of the invention, and at the same time in order to describe some of the novel features and applications of the present invention. Such obvious applications as its use in place of electrical resistance wire in standard electrical heating devices or in heated clothing have not been elaborated here, but are clearly within the filed of use of the film.

For uses of the film where only comparatively small areas are needed, the long lengths exemplified by FIGS. 1 and 2 may be cut into lengths of full width or when the pattern is suitably laid out, e.g. in repeating width sequence, into lengths of less than full width and for such cases it is possible to produce pieces with extended tongue form terminals without waste. This is particularly suitable where the insulating coverings are not bonded to the foil but only to one another in the spaces between the arms and beyond the outer edges of the foil. Such terminals are produced by cutting along lines such as 56 in FIG. 2. These include a longitudinal part which divides the busbars widthwise, leaving electrical continuity of the pattern in the remaining length of the film and therefore in successive pieces as they are cut off unimpaired although each piece will have two extended terminals marked 57 in FIG. 2. Such waste-free cutting can be employed to produce individual films having tongue like terminals extending by a length up to almost the length of the next piece. If a piece so severed contains only one meander path, the arms of the pattern will be in series across the terminals, while if there is more than one meander path the several paths will be in parallel across the terminals.

In some cases the tongue-form terminal is less suitable than a terminal form provided by an extension of the heating film over its whole breadth beyond the area heated by the electric current running through the meander arms. Without forming special terminal shapes in either the metal foil pattern or the covering films such extension can be provided by cutting the roll of patterned metal foil across its entire width within the length of the meander pattern preceding the pattern or patterns forming the current path of the individual heating film e.g. on the line 58, FIG. 1. The end area of the cut pattern thus remains an area of electrically unconnected arms, and when contacted at any two places on the two bare or bared first and last arms at the margins of the film, the current is conducted to the intact meander pattern only.

Another form of terminal which is often useful, for example when the complete piece of film extends beyond the area to be heated, is practically half the total width of the pattern, the two terminals thus occupying practically the whole of the width. An example is shown in FIG. 28. Here a cross line gap 59 is made for example by scraping the foil off the insulating covering leaving only the busbars or marginal arms 61 intact. A second, longitudinal gap 62 is made extending from the gap 59 to the end of the terminal area; generally this longitudinal gap 62 will align with a row of spaces in the pattern. Between the arms 61 and beyond the gap 50, the arms will at this stage be electrically isolated, but a separate conductive connection 63 is made between them on each side of the gap 62, for example by a strip of foil soldered, ultrasonically welded, crimped, or adhesively secured as above described with reference to FIGS. 15 and 16. The previously isolated arms are thus brought in conductively, and together with the respective marginal arms 61 form part of a terminal which being of much greater conductive cross section than the meander pattern avoids voltage drop and remains comparatively cool when the film is connected to a supply through these terminals. It will be understood that the terminals produced in this way can be of much greater length than in FIG. 28. and in effect can form long leads which can if necessary be folded to change their direction for example similarly to the leads in FIGS. 12, 14 and 18. Also the cross gap 50 could be made at the location of one row of bridges.

The meander patterns specifically described so far have all been rectangular patterns with arms of constant width produced by slits of equal length for the same pattern. Where desirable however, the invention provides a heat distributing surface pattern of any desired non-uniform distribution which necessitates the arrangement of slits of different lengths and spacings and even variable widths. Heating films of such arbitrary shape are proposed for contact heating of foodstuff of peculiar shape, for instance flat fish, space heating films for application to peculiarly shaped parts of the walls of motor-car-bodies, drying films for peculiarly shaped structural parts, etc.

In such patterns the arms forming the terminals or busbars, the first and last arms, are not always at the outside of the pattern but can be situated anywhere within the pattern area. In rectangular patterns as well as in others more than two terminals are sometimes provided, and this provision is more often used with arbitrarily shaped patterns.

An example of such an arbitrarily shaped pattern, which might serve for example for heating a flat fish and which notwithstanding its shape and distribution lends itself to repetition production is shown in FIG. 29. Here the longitudinal slits 64 are first made in a rectangular piece of foil 64 and the margins of the slits folded back on to the arms of the pattern. The piece of foil is still sufficiently coherent to be handled. It is now mounted on a lower insulating covering 66 extending beyond the width of the foil on each side. Slots 67 are now made which in effect confine the pattern to the desired area, bring the two meander paths into series, and form two terminal areas 68. The film is completed by another insulating covering 69 on the upper surface, which covers most of the slots 67 but it only extends up to the line 71 leaving the terminal areas 68 bare on this side so that connection can be made to them, for example by clip type connections. It will be seen that the pattern here is not only confined to an arbitrary outline, but that both the width as well as the length of arms varies, thus varying the distribution of resistance and therefore heating; also that the first and last arms are not on the outside but on the inside.

A particular construction of heating film useful for many purposes is illustrated in cross-section in FIG. 30. Here the foil pattern 82 comprising meander arms extending between wide marginal arms or busbars constituting terminals 83 is covered on each side with a thin sheet 84 of insulation such as paper placed to expose one busbar and cover the other on opposite sides along opposite edges respectively. This insulated pattern is sandwiched between two metallic layers 85 which are in conductive contact respectively with the busbars of the pattern but they do not extend beyond the sides of the pattern as far as the insulation so that they are insulated from one another and can serve as terminals for connecting the complete structure in circuit. As shown the two busbars are folded over the insulation on opposite surfaces to ensure good contact with the respective metallic layers but this folding is not always necessary. It will also be understood that the pattern 82 may itself be a complete heating film as above described to which the two insulating layers 84 would be additional. It may then be necessary to bare parts of the busbars which have to make contact with the outer metallic layers.

The foil pattern for the heating film of the invention having the margins of the slits folded over on to the arms may be produced by press tools individually dimensioned for a particular pattern. Long lengths are then produced step by step, the material remaining stationary while the tools are operating. Short films, i.e. not substantially longer than the press tools, can be made individually, including arbitrary shapes as in FIG. 29. However, the present invention provides simple methods for the economic production of the foil pattern by operations on a foil drawn continuously from the roll.

Anodized aluminum foil tapes having their margins folded over have been proposed for magnet windings but the methods used for folding the margins are not applicable to the heating film with its closely spaced lines of interrupted slits. The present invention provides a method in which the foil drawn continuously from the roll is slit and the margins of the foil on either side of each slit are by the slitting operation itself folded through about a right angle and folding of the margin through 180° i.e. back on to the arms, is completed immediately thereafter. Preferably the foil is carried in a curved path during slitting when the partial folding is effected towards the concave side of the curved path and it then enters a second path of reverse curvature thereby bringing the folded margins on to the convex side of the reversed path so that the natural tension tends to complete the folding.

I claim:

1. An article of manufacture adapted to form a boundary between two distinct heating zones and comprising in combination, a prefabricated sheet material heating element comprising a thermally insulating layer and at least one meandering electric resistance circuit pattern film disposed on each side of said thermally insulating layer to sandwich it therebetween, each film adapted to dispense heat primarily from said thermally insulating layer outwardly on opposite sides thereof, and a covering over the film disposed on one side of said thermally insulating layer, said covering of substantially less thermal insulating power than said thermally insulating layer wherein said meandering films disposed on opposite sides of said insulating layer have identical meander patterns.

2. The article of claim 1 wherein each of said meandering films has structure thereon reflecting heat from the other film away therefrom.

3. The article of claim 1 wherein said meandering films comprise a plurality of substantially parallel meander arms with bridges joining at least the ends of two adjacent arms.

4. The article of claim 1 having bonded thereto on one side a conventional wall covering fabric.

5. The article of claim 1 having in thermal contact therewith a material which undergoes chemical reaction when heated by said meandering film.

6. The article of claim 1 including means for moving said meandering film, means disposing electrical terminals for said meandering film accessibly on said film, means contacting at least one of said meandering films at said electrical terminals as the film is moved and means supplying electrical energy thereto.

7. The article of claim 6 including a resistive pattern disposed on said meandering film to comprise said electrical terminals such that as the film is moved past the terminals, current is maximized and decreases on either side of said terminals.

8. The article of claim 6 wherein said pattern is disposed in strip form and said terminals are disposed on opposite sides of the strip, including two electrodes disposed to contact the meander pattern along the strip at two positions remotely located from said terminals, and transformer means energizing said electrodes and said terminals with two equal and opposite potentials.

9. An article of manufacture adapted to form a boundary between two distinct heating zones and comprising in combination, a prefabricated sheet material heating element comprising a thermally insulating layer and at least one meandering electric resistance circuit pattern film disposed on each side of said thermally insulating layer to sandwich it therebetween, each film adapted to dispense heat primarily from said thermally insulating layer outwardly on opposite sides thereof, and a covering over the film disposed on one side of said thermally insulating layer, said covering of substantially less thermal insulating power than said thermally insulating layer, said meandering films being disposed to provide at least two different regions each of which will form an individual electric heater if the regions are cut from the sheet material, and wherein the sheet material comprises a long strip with the regions disposed in sequence along the length of the sheet material, and wherein there are widened conductive arms disposed on opposite sides of the sheet material strip extending along its length to provide terminals with the meander paths therebetween to provide a pattern for cutting from the length tongue-like terminals without waste of material, where the cuts divide the width of the wide arms at opposite sides of the sheet with at least one meander path of the resistance film therebetween.

10. An article of manufacture adapted to form a boundary between two distinct heating zones and comprising in combination, a prefabricated sheet material heating element comprising a thermally insulating layer and at least one meandering electric resistance circuit pattern film disposed on each side of said thermally insulating layer to sandwich it therebetween, each film adapted to dispense heat primarily from said thermally insulating layer outwardly on opposite sides thereof, and a covering over the film disposed on one side of said thermally insulating layer, said covering of substantially less thermal insulating power than said thermally insulating layer, said meandering resistance patterns are so disposed to provide at least two different regions each of which will form an individual electric heater if the regions are cut from the sheet material, and wherein the resistance patterns comprise a plurality of substantially parallel meander arms with bridges joining at least the ends of two adjacent arms, and at least the arms of the meander pattern are crimped with crimp lines running across the arms with a noncrimped linear narrow zone between crimped sections to facilitate folding or severing along the linear zone.

11. The article of claim 10 wherein the crimps are respectively 180° out of phase on opposite sides of the narrow linear zone and directed to opposite hands in relation to the narrow linear zone.

12. An article of manufacture adapted to form a boundary between two distinct heating zones and comprising in combination, a prefabricated sheet material heating element comprising a thermally insulating layer and at least one meandering electric resistance circuit pattern film disposed on each side of said thermally insulating layer to sandwich it therebetween, each film adapted to dispense heat primarily from said thermally insulating layer outwardly on opposite sides thereof, and a covering over the film disposed on one side of said thermally insulating layer, said covering of substantially less thermal insulating power than said thermally insulating layer, said meandering films on each side of said insulating layer disposed to provide at least two different regions each of which will form an individual electric heater if the regions are cut from the sheet material, meandering films comprising a plurality of substantially parallel meander arms with bridges joining at least the ends of two adjacent arms, a cross gap extending across a plurality of the adjacent arms, and a conductive connection placed adjacent the cross gap to join the arms severed by the cross gap.

13. An article of manufacture adapted to form a boundary between two distinct heating zones and comprising in combination, a prefabricated sheet material heating element comprising a thermally insulating layer and at least one meandering electric resistance circuit pattern film disposed on each side of said thermally insulating layer to sandwich it therebetween, each film adapted to dispense heat primarily from said thermally insulating layer outwardly on opposite sides thereof, and a covering over the film disposed on one side of said thermally insulating layer, said covering of substantially less thermal insulating power than said thermally insulating layer, said covering being disposed on both sides leaving terminals at the two ends of said meandering films bare on opposite sides, and two metallic layers sandwiching said meandering films and coverings on both sides contacting respectively said bare ends, said two metallic layers being electrically insulated from each other.

14. An article of manufacture adapted to form a boundary between two distinct heating zones and comprising in combination, a prefabricated sheet material heating element comprising a thermally insulating layer and at least one meandering electric resistance circuit pattern film disposed on each side of said thermally insulating layer to sandwich it therebetween, each film adapted to dispense heat primarily from said thermally insulating layer outwardly on opposite sides thereof, and a covering over the film disposed on one side of said thermally insulating layer, said covering of substantially less thermal insulating power than said thermally insulating layer, said meandering films being disposed to provide at least two different regions each of which will form an individual electric heater if the regions are cut from the sheet material, and having bonded thereto on one side a conventional wall covering fabric, conductive foil strips interconnecting said meandering films, and supply source terminals connected to said conductive foil strips.

15. An article of manufacture adapted to form a boundary between two distinct heating zones and comprising in combination, a prefabricated sheet material heating element comprising a thermally insulating layer and at least one meandering electric resistance circuit pattern film disposed on each side of said thermally insulating layer to sandwich it therebetween, each film adapted to dispense heat primarily from said thermally insulating layer outwardly on opposite sides thereof, and a covering over the film disposed on one side of said thermally insulating layer, said covering of substantially less thermal insulating power than said thermally insulating layer, said meandering films are so disposed to provide at least two different regions each of which will form an individual electric heater if the regions are cut from the sheet material, and said meandering films comprise a plurality of substantially parallel meander arms with bridges joining at least the ends of two adjacent arms, and wherein a strip of said meandering film has at least two longitudinally adjacent meander patterns and at least some of the meander arms are continuous over the two longitudinally adjacent patterns alternating with meander arms extending over only one of the two longitudinally adjacent patterns, with two terminals comprising a conductive pattern of substantially lower resistance than said meandering films, but of substantially the same thickness, and including at least in part some of said meandering films, said terminals providing at least one meander path therebetween and producing a conductive pattern having a resistance substantially lower than that of the meander path.

16. The article of claim 15 wherein the meander patterns are disposed so that single heating films each containing any desirable number of meander patterns may be severed therefrom by a single straight line cut.

17. The article of claim 15 wherein at least a part of the width of one terminal is folded over to contact conductively a further portion of the meander pattern on said strip.

18. The article of claim 15 wherein one said terminal is partly severed and the severed portion is folded over to form a lead away from said strip.

19. The article of claim 15 wherein the terminals consist of parts of the said meandering films wider than the parts of the meander path arms to thereby produce said lower resistance.

20. A heater of sheet-like form adapted to form a boundary between two distinct zones to be heated and comprising in combination, a primary heater-support of electrically and thermally insulating material, at least two flexible, meandering, electric resistance patterns affixed to opposite faces respectively of said primary support, each of said resistance patterns being comprised of flexible metallic foil material and acting as a reflector of radiant heat from the other pattern, and a covering over the resistance pattern on one face of said primary support, said covering being of electrically insulating material which is thin and of low thermal insulation compared with said primary support.

21. A heater according to claim 20, and including means for securing the pattern not covered by said covering to a wall and in good thermal contact therewith, whereby space heating means are provided in which heat from the last pattern is stored in said wall and heat from the other pattern is radiated in the space away from said wall.

22. A heater according to claim 20, in combination with means for energizing the two said patterns independently.

23. A heater according to claim 20, and wherein the pattern not covered by said covering has a coating thereon of a material which undergoes a substantial change in physical state when heated by the last said pattern.

24. A heater as defined in claim 20, wherein the heater covering is of flexible material.

* * * * *